United States Patent [19]

Young

[11] Patent Number: 4,929,114
[45] Date of Patent: May 29, 1990

[54] TUBING CONNECTOR

[76] Inventor: Errol D. Young, 3505 Old Maple Rd., Omaha, Nebr. 68134

[21] Appl. No.: 309,215

[22] Filed: Feb. 13, 1989

[51] Int. Cl.⁵ .............................................. F16B 7/00
[52] U.S. Cl. ..................................... 403/172; 403/297
[58] Field of Search ............... 403/297, 295, 170, 171, 403/172, 178, 245

[56] References Cited

U.S. PATENT DOCUMENTS

| | | | |
|---|---|---|---|
| 3,620,558 | 11/1971 | MacMillan | 403/297 X |
| 3,736,009 | 5/1973 | Juhnke | 403/297 X |
| 3,910,613 | 8/1975 | Andersson | 403/178 X |
| 3,977,800 | 8/1976 | Cassel | 403/297 X |
| 4,090,798 | 5/1978 | Barton | 403/171 |
| 4,139,316 | 2/1979 | Svensson | 403/172 |

*Primary Examiner*—Peter M. Cuomo
*Attorney, Agent, or Firm*—Zarley, McKee, Thomte, Voorhees & Sease

[57] ABSTRACT

A tubing connector enables an attachment tube to be selectively and removably connected to the side of a base tube. A tubular support member is affixed to the base tube and projects therefrom. A clip is mounted to one wall of the support member, and has an aperture therethrough which is threaded to receive a set screw. A slot in the wall of the support member allows the set screw to pass therethrough. The set screw is of a length which will extend across the interior of the support member so as to contact the opposite wall when rotated in a clockwise fashion. The attachment tube is connected to the support member by sliding the attachment tube thereover. The attachment tube has an aperture aligned with the set screw to allow access thereto. Clockwise rotation of the set screw will expand the support member by pushing outwardly on the wall with the clip on it and the wall opposing the clip, thereby causing frictional contact with the attachment tube. A second embodiment of the invention utilizes a support tube which has a threaded aperture in place of the removable clip of the first embodiment. Rotation of the set screw forces the opposite walls of the support member apart so as to cause frictional contact with the interior of the attachment tube and firmly hold it in place.

4 Claims, 4 Drawing Sheets

TUBING CONNECTOR

TECHNICAL FIELD

The present invention relates generally to a connector for attaching sections of tubing to one another.

BACKGROUND OF THE INVENTION

In the fabrication of store fixtures and support structures for other uses, it is common to utilize sections of modular tubing which are removably connected together. In forming a "T" connection, wherein the end of one elongated tube is mounted perpendicularly to the side of a second elongated tube, it is common to affix a tubular peg or the like to the side of the tube over which the hollow end of the second tube is then removably mounted. The problem with such a method is that the peg is welded to the tube along its outside edges, discoloring the tube and permitting easy observation of unsightly welds.

A second problem with previous connection methods was in the use of a set screw or the like threaded through an aperture in the attachment tube so as to abut the connector peg on the base tube. Because the tube was of a material which was relatively thin, there were few threads capable of supporting the set screw. Thus, the aperture threads could easily be stripped upon overtightening of the set screw.

Another problem lies in the use of set screws is in the fact that set screws. Set screws can be easily lost when backed out of the threaded aperture. In order to remove the attachment tube from the peg of prior art connectors, it was necessary to back the set screw outwardly nearly completely from the tube. Keeping track of small parts such as set screw and the like is time consuming and can result in the needless loss of time in attempting to assemble a tubing support frame.

It is therefore a general object of the present invention to provide an improved tubing connector.

Another object of the present invention is to provide a tubing connector which is mountable to the side of a tube without requiring an outside observable weld.

A further object is to provide a tubing connector which will more securely hold the attachment tube in combination with the base tube, than prior art connectors.

Another object of the present invention is to provide a tubing connector of a type with a set screw which cannot be backed out of the attachment tube.

Yet another object of the present invention is to provide a tubing connector which is simple to manufacture and easy to install and use.

These and other objects of the present invention will be apparent to those skilled in the art.

SUMMARY OF THE INVENTION

The tubing connector of the present invention enables an attachment tube to be selectively and removably connected to the side of a base tube. A tubular support member is affixed to the base tube and projects therefrom. An opening in the base of the support member allows the support member to be welded to the base tube on the interior edge, so as to leave a "clean" edge along the exterior of the support member. A clip is mounted to one wall of the support member, and has an aperture therethrough which is threaded to receive a set screw. A slot in the wall of the support member allows the set screw to pass therethrough. The set screw is preferably of a length which will extend across the interior of the support member so as to contact the opposite wall when rotated in a clockwise fashion. In this way, clockwise rotation will expand the support member by pushing outwardly on the wall with the clip on it and the wall opposing the clip. The attachment tube is connected to the support member by sliding the attachment tube thereover. The attachment tube has an aperture slightly smaller than the diameter of the set screw, and aligned therewith, such that a hex wrench or the like may be inserted through the aperture in the attachment tube to rotate the set screw. In this fashion, expansion of the support member will cause frictional contact with the attachment tube to firmly hold the attachment tube in place.

A second embodiment of the invention is designed for use with an attachment tube which has a length greater than its width. In such a case, the support member of the first embodiment is still utilized, but is located adjacent a filler member. A slightly longer set screw is utilized, and an aperture is formed in the rearward wall of the support member such that the set screw will pass completely through the support member and project against one wall of the filler member. Once the attachment tube is placed over the support member and filler member, the set screw may be rotated so as to force the filler member away from the support member, thereby causing frictional contact against opposite interior walls of the attachment tube to firmly hold it in place.

A third embodiment of the invention utilizes a support tube which has a threaded aperture in place of the removable clip of the first embodiment. Rotation of the set screw again forces the opposite walls of the support member apart so as to cause frictional contact with the interior of the attachment tube and firmly hold it in place.

DESCRIPTION OF THE PREFERRED EMBODIMENT

Figure 1:
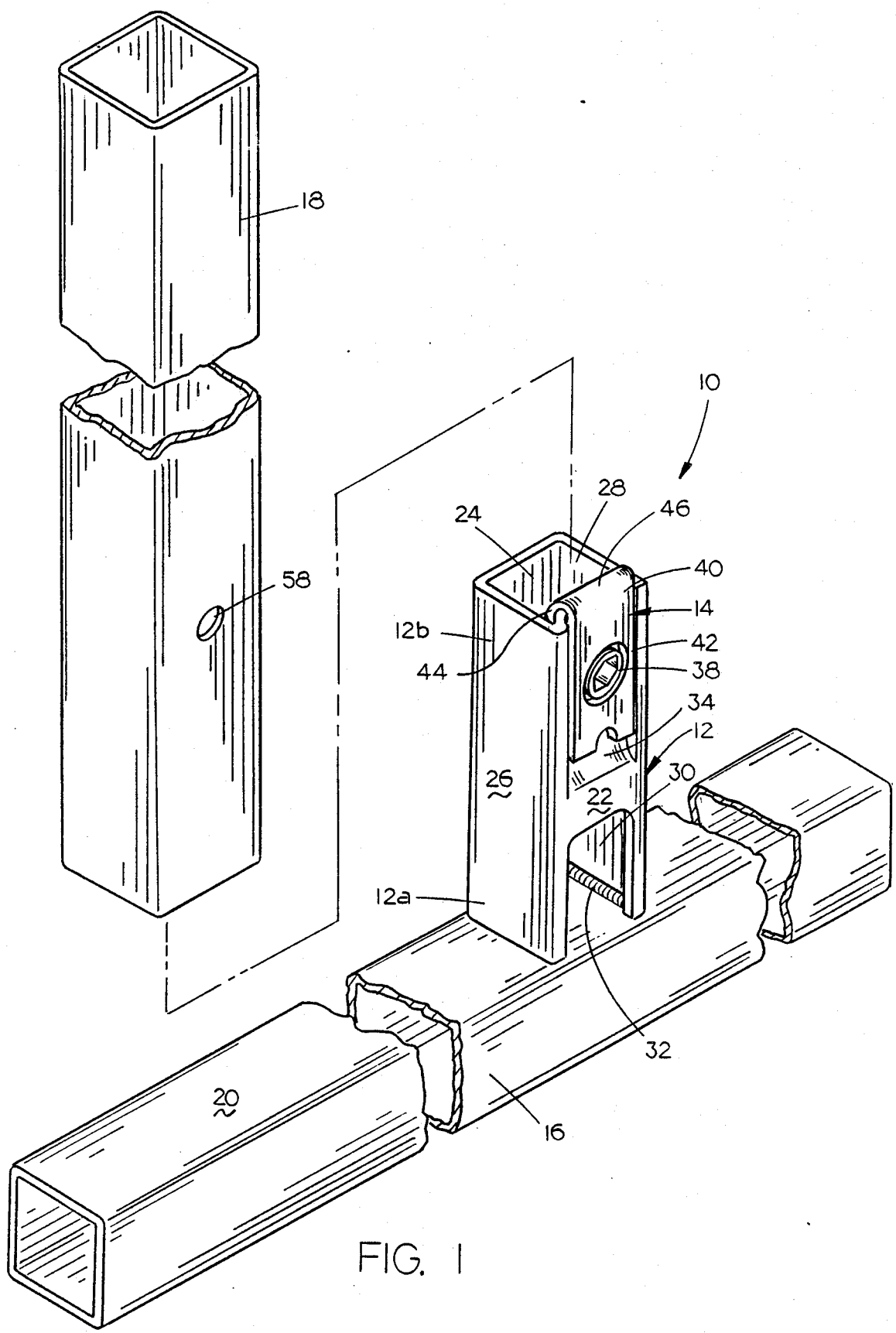
FIG. 1 is an exploded perspective view of the tubing connector of the invention utilized in connecting an attachment tube to a base tube.

Referring now to the drawings, in which identical or corresponding parts are identified by the same reference numeral, and more particularly to FIG. 1, the tubing connector of the present invention is designated generally at 10 and includes a support member 12 and a removable clip 14.

For purposes of description, a first elongated tube 16 will be identified as the "base" tube, and will serve as the tube upon which a second "attachment tube" 18 will be connected. Base tube 16 is preferably rectangular and includes an upper longitudinal side 20 upon which one end of attachment tube 18 will be connected. Although this description will show attachment tube 18 connected to base tube 16 in a perpendicular fashion, it should be understood that various angles of connection between the tubes 18 and 16 are also possible utilizing the present invention.

Support member 12 is a generally rectangular upstanding hollow tubular member having a forward face 22, opposing rearward face 24 and a pair of opposite sides 26 and 28. For purposes of description, support member 12 will be designated as having a lower end 12a and upper end 12b. The lower end of front face 22 has an aperture 30 therein which allows access to the interior of support member 12. Aperture 30 allows support member 12 to have weld 32 applied along the interior thereof. Thus, a "clean" connection between connector 10 and base tube 16 is possible along the outside edges of support member 12.

Front face 22 of support member 12 has an indented surface 34 extending to the upper end 12b, as shown in the drawings. Indented surface 34 is indented a distance such that attachment of clip 14 thereto will form a generally flush surface along face 22. An aperture 36 in indented surface 34 will receive a set screw 38 mounted on clip 14, as described in more detail hereinbelow.

Figure 2:
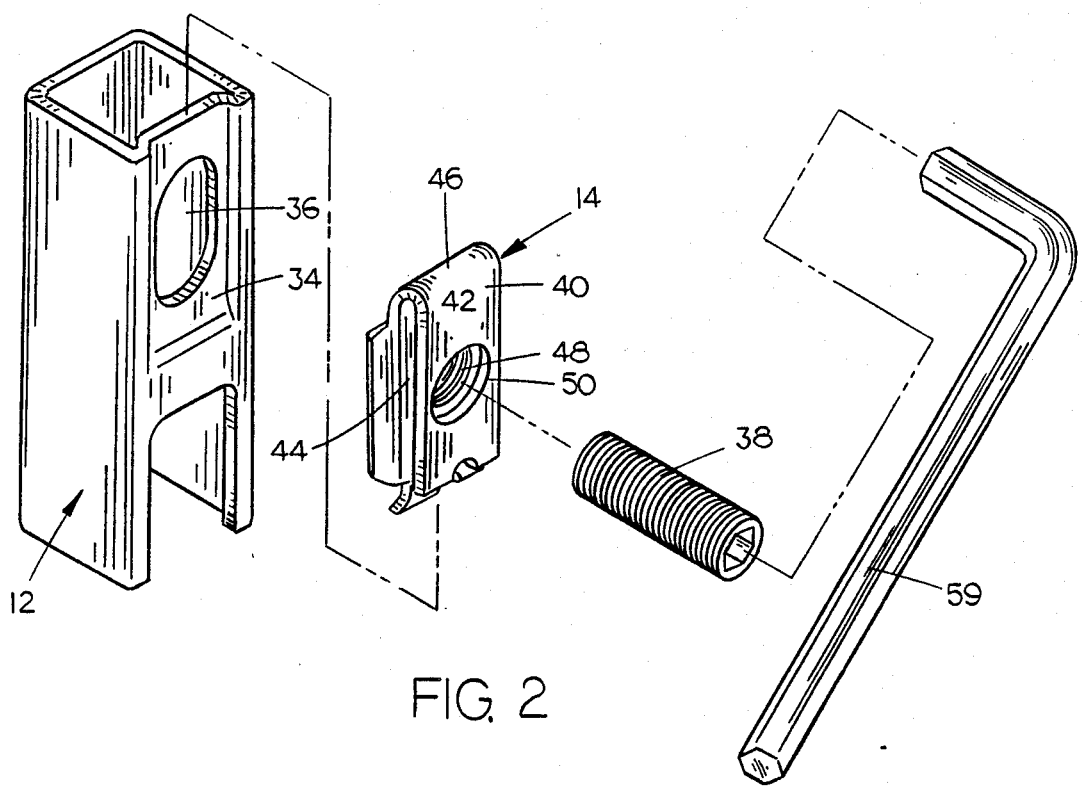
FIG. 2 is an exploded perspective view of the connector of the present invention.
Figures 3, 4, 5:
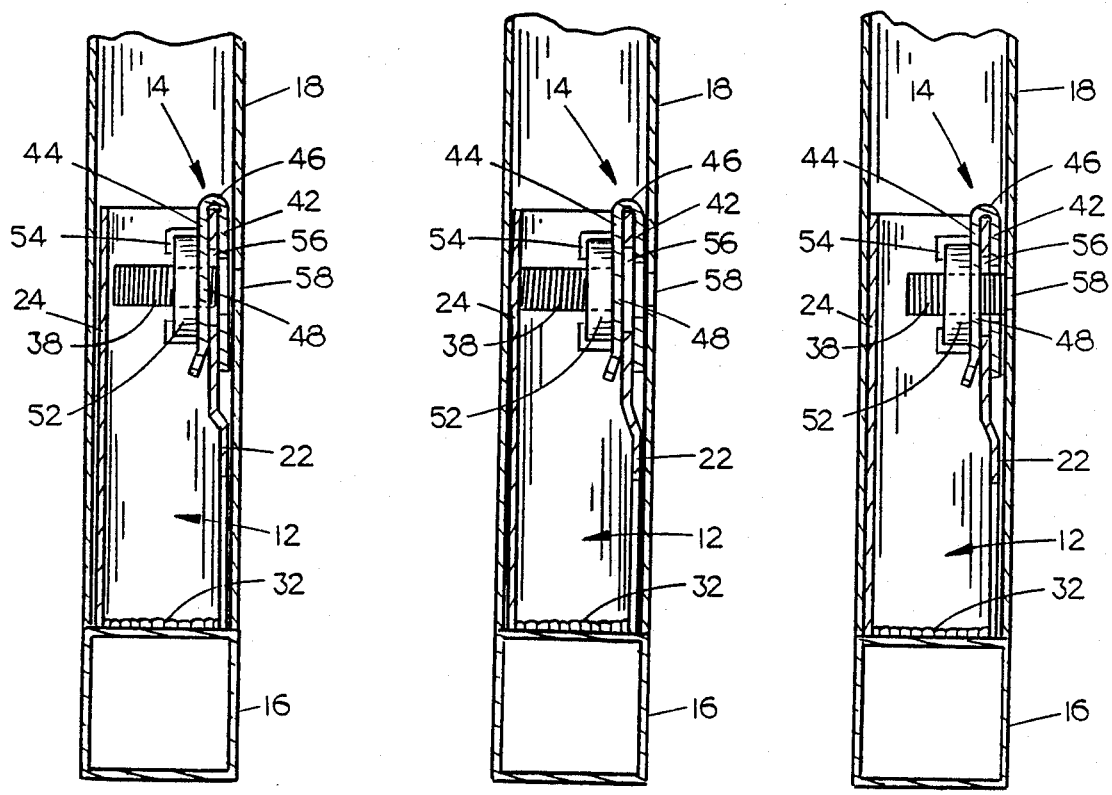
FIG. 3 is a vertical sectional view of the connector in an initial position.
FIG. 4 is a vertical sectional view of the connector in its gripping position.
FIG. 5 is a vertical sectional view of the connector in a temporary gripping position.

Referring now to FIGS. 2 and 3, clip 14 includes a bracket 40 bent to form a forward leg 42 and rearward leg 44 with a bend 46 therebetween holding legs 42 and 44 in parallel relationship. Rearward leg 44 has a threaded aperture 48 generally centered therethrough which will threadably receive set screw 38 therethrough. Forward leg 42 has an aperture 50 therethrough larger than, and axial to, aperture 48, such that set screw 38 may be inserted therethrough. A nut 52 is held in position over aperture 48 by a pair of rigid lips 54 as shown in the drawings. Lips 54 will retain nut 52 in position so that it will not rotate or be pushed outwardly away from rearward leg 44 as set screw 38 is threaded therethrough.

A small arcuate lip 56 is formed to project inwardly from forward leg 42 so as to be retained by the upper edge of aperture 36 once clip 14 is placed in position on forward face 22 of support member 12. Forward leg 42 of bracket 40 has a thickness substantially equal to the depth of the indentation of indented surface 34 on front face 22, so as to form a flush surface when clip 14 is installed on indented surface 34 (see FIG. 3), so that attachment tube 18 will slide easily over support member 12.

An aperture 58 is formed in attachment tube 18 which will be aligned with apertures 48 and 50 so as to allow insertion of a wrench 59 to rotate set screw 38. The diameter of aperture 58 is preferably smaller than the exterior diameter of the head of set screw 38, such that counterclockwise rotation of set screw 38 will abut the head of the set screw against the interior surface of attachment tube 18, as shown in FIG. 5, for a purpose described below.

The tubing connector 10 of the present invention is utilized in situations where an attachment tube 18 is to be extended outwardly from a base tube 16. The support member 12 is first affixed in the appropriate position on base tube 16 by welding or the like. A clip 14 is then slipped over indented surface 34 such that lip 56 on leg 42 is received in aperture 36 to hold the clip in place.

Attachment tube 18 is then slid over connector 10 (see FIG. 3) like a sleeve until aperture 58 is aligned with apertures 48 and 50 and the head of set screw 38 is viewed in aperture 58. Clockwise rotation of set screw 38 by a hex wrench 59, screwdriver or the like, will cause the end of set screw 38 to press against the interior side of the rearward face 24 of support member 12. This will bias rearward face 24 and forward face 22 outwardly in opposite directions and thereby grip attachment tube 18 by outward enlargement of support member 12 (see FIG. 4). Enlargement of the diameter of support member 12 firmly grips attachment tube 18.

A less firm, temporary grip is possible by rotating set screw 38 in a counterclockwise direction such that the head of set screw 38 abuts against the interior face of attachment tube 18 (see FIG. 5). The small amount of force will maintain the position of attachment tube 18 until it is desired to fully tighten the connection by clockwise rotation of the set screw.

Figure 6:
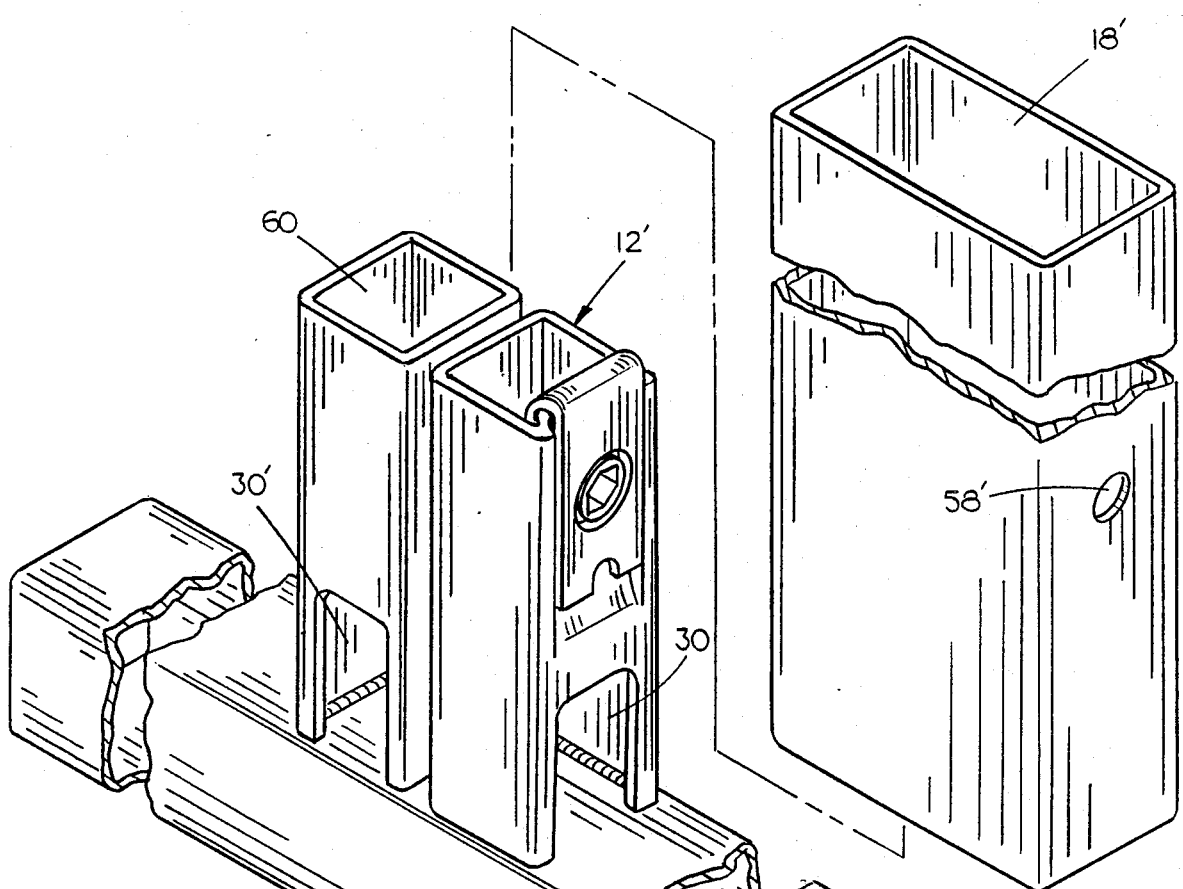
FIG. 6 is an exploded perspective view of a second embodiment of the invention.
Figure 7:
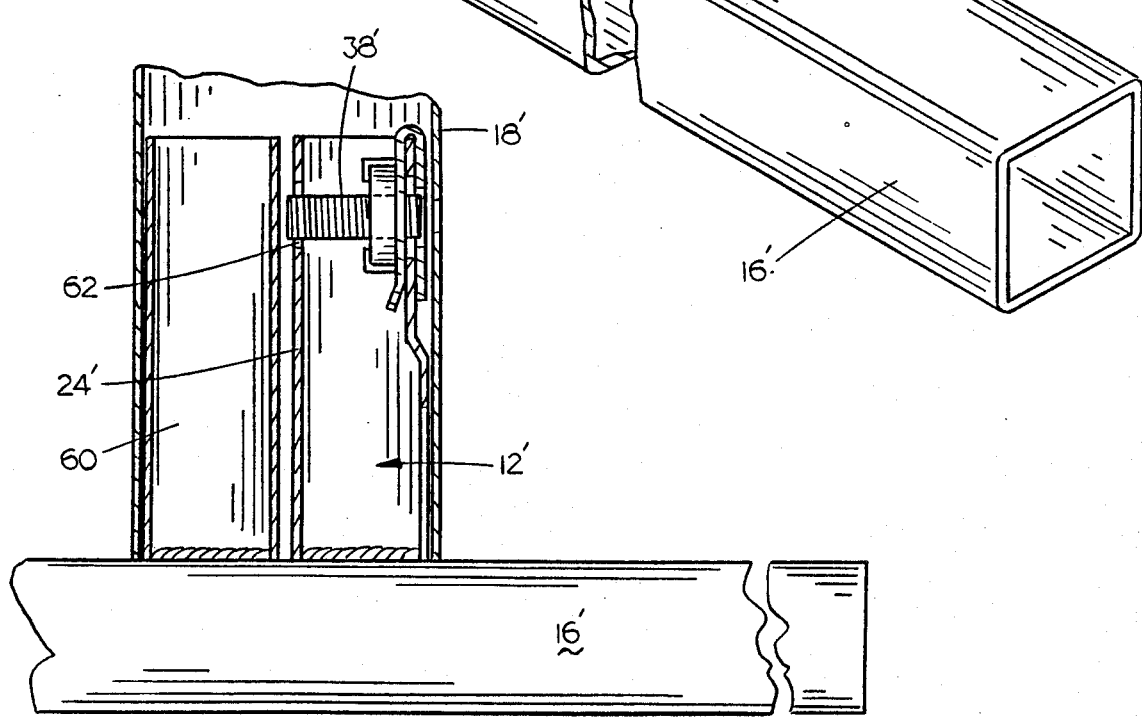
FIG. 7 is a vertical sectional view of the second embodiment of the invention.

Referring now to FIGS. 6 and 7, a second embodiment of the invention is utilized in situations where the attachment tube 18' has a cross-section twice as wide as its depth. While an elongated version of the first embodiment would work, it is preferred that the embodiment shown in FIGS. 6 and 7 be utilized in such a situation. A support member 12' is utilized in combination with a second filler member 60 having approximately the same cross-sectional diameter. Support member 12' and filler member 60 are mounted to base tube 16 such that attachment tube 18' will fit thereover with close tolerance. An aperture 62 is formed in rear wall 24' of support member 12' such that set screw 38' will extend therethrough and against one wall of filler member 60. An aperture 30' in filler member 60 allows filler member 60 to be welded to base tube 16' along the interior lower edge, in a fashion similar to support member 12'. Attachment tube 18' has an aperture 58' located so as to access set screw 38' in a manner similar to that of aperture 58 in attachment tube 18.

Figure 8:
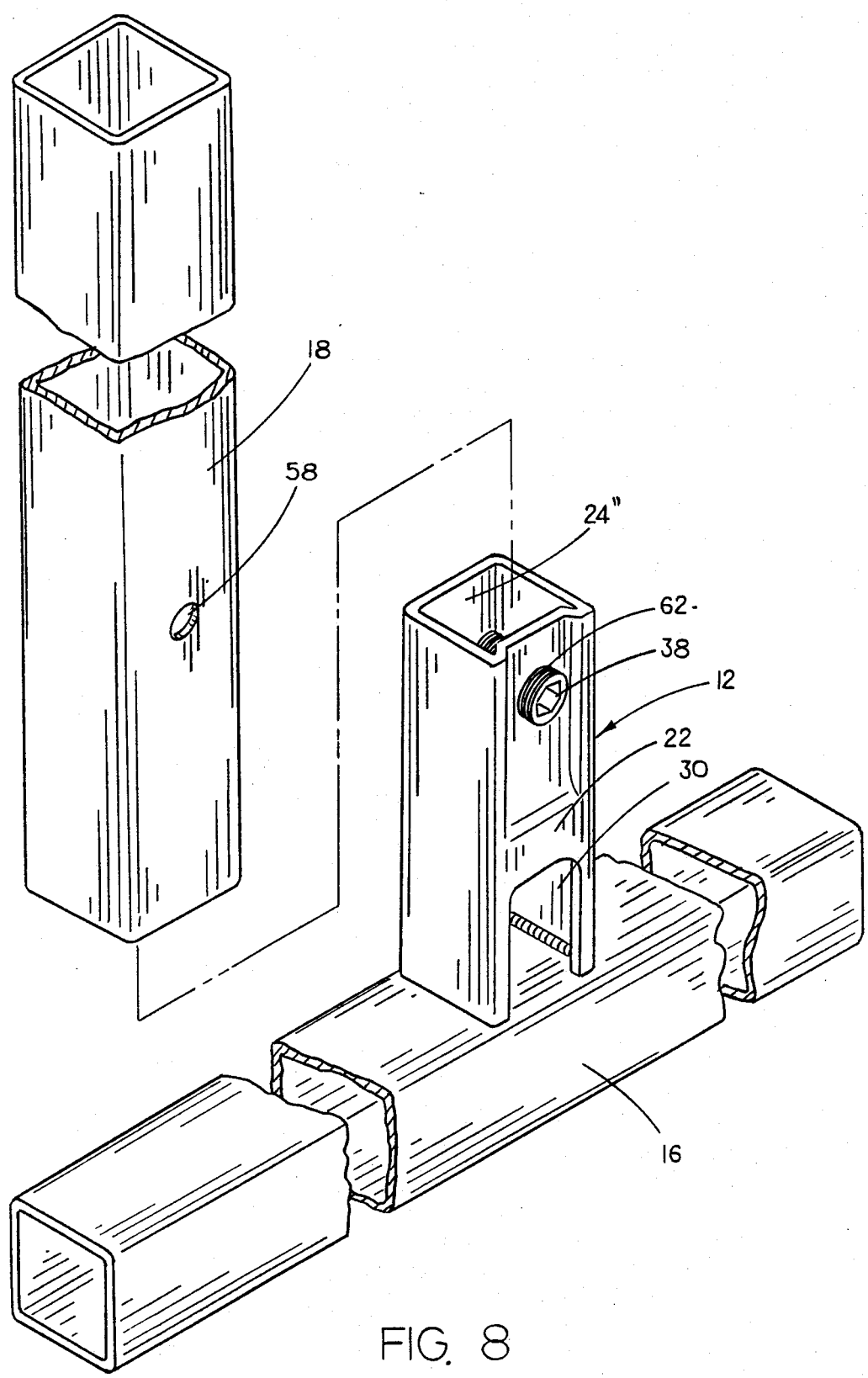
FIG. 8 exploded perspective view of a third embodiment of the tubing connector utilized in connecting an attachment tube to a base tube.

In a third embodiment of the invention, as shown in FIG. 8, the base tube 16 and attachment tube 18 are identical to those of the first embodiment, the change being only in the support member 12". In this embodiment of the invention, support member 12" has a threaded aperture 62 in its forward wall 22". This eliminates the necessity for utilizing the removable clip 14 of the first embodiment. Set screw 38" is threaded through aperture 62 and will abut the rearward wall 24" when rotated in a clockwise direction. Attachment tube 18 has an aperture 58 identical to that of the first embodiment, with a diameter slightly less than the diameter of set screw 38", such that the set screw cannot be backed out of the support member through aperture 58 in attachment tube 18.

Whereas the invention has been shown and described in connection with the preferred embodiments thereof, it will be understood that many modifications, substitutions and additions may be made which are within the intended broad scope of the appended claims. For example, nut 52 may be permanently affixed to rearward leg 44 of bracket 40, so as to maintain the position of the nut thereon. Likewise, set screw 38 may have a hex-type head, or a slot for receiving a screwdriver, such that the set screw may be operated by insertion of the appropriate tool through the aperture in the attachment tube wall.

It can therefore be seen that the tubing connector of the present invention fulfills at least all of the above-stated objectives.

I claim:

1. In combination
   a base tube having opposite ends and a first side;
   an attachment tube for connection to said base tube, having first and second ends and a first side, said first side having an aperture therethrough adjacent the first end thereof;
   connector means for removably connecting said first end of said attachment tube to said first side of said first base tube, comprising:
   a hollow tubular support member having upper and lower ends, a forward wall, a rearward wall and opposing side walls affixed to said base tube first side and projecting therefrom;
   threaded means on said forward wall for operably receiving a set screw means;
   set screw means having a head end and an opposite second end, operably mounted in said threaded means and having a length slightly less than the distance between the forward and rearward walls of said tubular support member;
   said attachment tube having dimensions so as to slidably receive said support member within said first end thereof;
   said attachment tube aperture located so as to be aligned with said threaded means when said attachment tube is placed on said support member;
   whereby rotation of said set screw means inwardly will cause said second end to contact the rearward wall of said support member and bias said forward and rearward walls of the support member apart into frictional contact with the walls of said attachment tube;
   said threaded means comprising:
   said forward walls of said support member having an aperture therethrough of a diameter greater than that of said set screw means, such that said set screw means will pass freely therethrough; and
   clip means connected to said forward wall having a threaded aperture therethrough adapted to operably receive a set screw, said clip means mounted with said threaded aperture axial to said support member aperture;
   said clip means including a bracket means bent to form a forward leg generally parallel to a rearward leg, said rearward leg having a threaded aperture therethrough adapted to operably receive said set screw, said forward leg having an aperture axial to said rearward leg aperture and having a diameter greater than said set screw such that said set screw will pass freely therethrough, said bracket means being connected to said support member forward wall with said forward and rearward legs on opposite sides thereof and with the apertures in said legs aligned with the aperture in said forward wall.

2. The combination of claim 1, wherein said forward wall is indented a distance approximately equal to the thickness of the forward leg of said bracket means, the indentation extending downwardly from the upper end of the support member a distance approximately equal to the length of said forward leg, the indentation having a width approximately equal to the width of the forward leg, such that said forward leg will be generally flush with portions of said forward wall which are not indented.

3. The combination of claim 1, further comprising a lip projecting from said bracket means, said lip engaging the aperture in said support member forward wall to prevent slidable movement of said bracket means on said support member forward wall.

4. In combination:
   a base tube having opposite ends and a first side;
   an attachment tube for connection to said base tube, having first and second ends, a pair of opposing longitudinal sides and a first and second opposing transverse walls;
   said attachment tube having an aperture in said first transverse wall adjacent said first end thereof;
   connector means for removably connecting said first end of said attachment tube to said first side of said base tube, comprising:
   a hollow tubular support member having upper and lower ends, forward and rearward transverse walls, and opposite longitudinal sides, affixed to said base tube first side and projecting therefrom;
   a hollow tubular filler member having forward and rearward transverse walls and opposite longitudinal sides, affixed to said base tube first side adjacent to and parallel with said support member and having said filler member longitudinal sides coplanar with said support member longitudinal sides;
   threaded means on said forward wall of said support member for operably receiving a set screw means;
   set screw means having a head end and an opposite second end, operably mounted in said threaded means and having a length slightly greater than the distance between the forward and rearward walls of said support member;
   said forward wall of said support member having an aperture therethrough;
   said threaded means comprising:
   clip means connected to said forward wall of said support member, having a threaded aperture therethrough adapted to operably receive a set screw, said clip means mounted with said threaded aperture axial to said support member aperture;
   said clip means including a bracket means bent to form a forward leg generally parallel to a rearward leg, said rearward leg having a threaded aperture therethrough adapted to operably receive said set screw, said forward leg having an aperture axial to said rearward leg aperture and having a diameter greater than said set screw such that said set screw will pass freely therethrough, said bracket means being connected to said support member forward wall with said forward and rearward legs on opposite sides thereof and with the apertures in said legs aligned with the aperture in said forward wall;
   said rearward wall of said support member having an aperture therethrough axial to said forward wall aperture, and having a diameter grater than the diameter of said set screw means such that said set screw means will pass freely therethrough;
   said attachment tube having dimensions to slidably receive said support member and filler member within said first end, the aperture in said forward wall of said attachment tube being aligned with said support member forward wall aperture when the attachment tube is placed on said support member and filler member so as to allow access to said forward wall aperture; and rotation of said set screw means inwardly causing said second end thereof to pass through the aperture in the rearward wall of said support member and contact the forward wall of said filler member to thereby bias the support member and filler member in opposite directions and into contact with the walls of said attachment tube.

* * * * *